(12) United States Patent
Goergen et al.

(10) Patent No.: US 11,543,844 B2
(45) Date of Patent: Jan. 3, 2023

(54) METHOD AND APPARATUS FOR TRANSMITTING POWER AND DATA IN A MULTI-DROP ARCHITECTURE

(71) Applicant: CISCO TECHNOLOGY, INC., San Jose, CA (US)

(72) Inventors: Joel Richard Goergen, Soulsbyville, CA (US); Chad M. Jones, Doylestown, OH (US); Emanuele Umberto Giacometti, Turin (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/035,527

(22) Filed: Sep. 28, 2020

(65) Prior Publication Data

US 2021/0263545 A1   Aug. 26, 2021

Related U.S. Application Data

(60) Provisional application No. 62/981,120, filed on Feb. 25, 2020.

(51) Int. Cl.
*H04L 12/10* (2006.01)
*G05F 1/577* (2006.01)
*G06F 21/44* (2013.01)

(52) U.S. Cl.
CPC .............. *G05F 1/577* (2013.01); *G06F 21/44* (2013.01); *H04L 12/10* (2013.01)

(58) Field of Classification Search
CPC ........... G05F 1/577; G06F 21/44; H04L 12/10
See application file for complete search history.

(56) References Cited

U.S. PATENT DOCUMENTS

| | | | |
|---|---|---|---|
| 6,640,308 B1 | 10/2003 | Keyghobad | |
| 7,843,670 B2 | 11/2010 | Blaha | |
| 10,541,758 B2 | 1/2020 | Goergen | |
| 10,631,443 B2 | 4/2020 | Byers | |
| 10,659,240 B2 | 5/2020 | Boemi | |
| 10,672,537 B2 | 6/2020 | Goergen | |
| 10,732,688 B2 | 8/2020 | Goergen | |
| 10,735,105 B2 | 8/2020 | Goergen | |
| 10,764,071 B1* | 9/2020 | Ciholas | G01R 19/2513 |
| 10,809,134 B2 | 10/2020 | Bullock | |
| 10,958,471 B2 | 3/2021 | Goergen | |
| 11,057,227 B2* | 7/2021 | Koper | H04L 41/04 |
| 2005/0132240 A1* | 6/2005 | Stineman, Jr. | H04L 12/10 |
| | | | 713/300 |
| 2006/0273661 A1* | 12/2006 | Toebes | G06F 1/266 |
| | | | 307/106 |

(Continued)

FOREIGN PATENT DOCUMENTS

CN    107147503    6/2020

*Primary Examiner* — Toan T Vu
*Assistant Examiner* — Thai H Tran

(57) ABSTRACT

In one or more embodiments, a T-adapter includes an input for receiving power and data on a wire pair, a first output for transmitting the power and data to a first load, a second output for transmitting the power and data to a second load, and a controller operable to detect and authenticate the first load at the first output or the second load at the second output and enable power at the first output or the second output in response to load detection and authentication.

20 Claims, 11 Drawing Sheets

(56) References Cited

U.S. PATENT DOCUMENTS

2008/0159744 A1\* 7/2008 Soto .................. H04M 19/08
                                                          398/115
2019/0272011 A1   9/2019 Goergen
2019/0363493 A1   11/2019 Sironi \* cited by examiner

METHOD AND APPARATUS FOR TRANSMITTING POWER AND DATA IN A MULTI-DROP ARCHITECTURE

STATEMENT OF RELATED APPLICATION

The present application claims priority from U.S. Provisional Application No. 62/981,120, entitled METHOD AND APPARATUS FOR SINGLE PAIR MULTI-DROP IN FAULT MANAGED POWER APPLICATIONS, filed on Feb. 25, 2020. The contents of this provisional application are incorporated herein by reference in its entirety.

TECHNICAL FIELD

The present disclosure relates generally to transmission of power and data, and more particularly, to Single Pair Multi-Drop (SPMD)

BACKGROUND

Single Pair Ethernet (SPE) is currently being targeted for industrial and commercial building applications in which reliability and redundancy will be desired.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
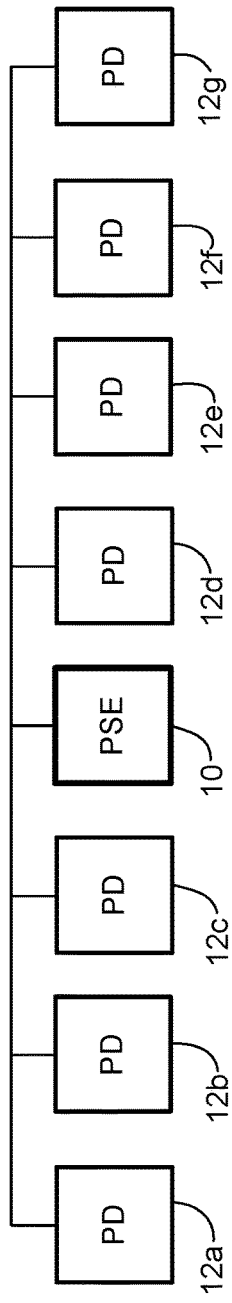
FIG. 1 is a block diagram illustrating an example of a multi-drop architecture with power sourcing equipment transmitting power and data to a plurality of powered devices.

In one embodiment a T-adapter generally comprises an input for receiving power and data on a wire pair, a first output for transmitting the power and data to a first load, a second output for transmitting the power and data to a second load, and a controller operable to detect and authenticate the first load at the first output or the second load at the second output and enable power at the first output or the second output in response to load detection and authentication.

In one embodiment, a method generally comprises receiving power and data on a wire pair at an input of a T-adapter, detecting a first load at a first output at the T-adapter, transmitting the power and data at the first output, detecting a second load at a second output at the T-adapter, and transmitting the power and data at the second output. At least one of the first load or the second load is authenticated at the T-adapter before transmitting power at the first output or the second output.

In yet another embodiment, a system generally comprises a plurality of powered devices and a plurality of T-adapters each comprising an input for receiving power and data, a first output for transmitting the power and data to one of the powered devices, and a second output for transmitting the power and data to the input of a downstream T-adapter or another one of the powered devices. Each of the T-adapters comprises a controller for detecting the powered device at the first output and transmitting the power and data to the powered device, and detecting the downstream T-adapter or the powered device at the second output and transmitting the power and data to the downstream T-adapter or the powered device.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Single Pair Ethernet (SPE) may be applied to industrial and commercial building applications and may target a "digital building" architecture implementation, for example. This new market for SPE may present a need for layers of reliability and redundancy, as well as hot-swap and fault managed power systems. For example, seamless active power loading/shedding is an issue in conventional systems. As described below, a single pair multi-drop (SPMD) active T-adapter provides for industrial or digital building applications that benefit from fault tolerance and managed devices.

One or more embodiments described herein address reliability, redundancy, and OIR (Online Insertion and Removal) functionality for single pair multi-drop in a digital building, industrial applications, or other applications. One or more embodiments may be implemented for example, for use with 10 Mb single pair multi-drop at approximately 75 meters and with 24 nodes, with power (or other distance and number of nodes). In one or more embodiments, the multi-drop architecture described herein provides an always on power source. It is to be understood that the architectures, number of nodes, and data speeds described herein are only examples and the single pair multi-drop system may be implemented in different network topologies under different operating conditions, without departing from the scope of the embodiments.

One or more embodiments may be implemented utilizing Fault Managed Power (FMP). An FMP device is one that controls the power output and discontinues power under fault. In one or more embodiments, PoE (Power over Ethernet) is included under the definition of FMP and may pave the way for power transmitted at >100 Watts with PoE installed by non-electricians.

In one or more embodiments, FMP may be implemented utilizing ESP (Extended Safe Power) with pulse power and safety features as described in U.S. patent application Ser. No. 16/671,508 ("Initialization and Synchronization for Pulse Power in a Network System"), filed Nov. 1, 2019, which is incorporated herein by reference in its entirety. The term "Extended Safe Power" ("ESP") refers to operation with pulse power delivered on one or more wires or wire pairs in a cable (e.g., Ethernet cable), transmission line, bus bar, or power distribution system. In one or more embodiments, ESP includes fault detection (e.g., fault detection at initialization and between high voltage pulses) and pulse synchronization. Power is delivered from power sourcing equipment (PSE) to a powered device (PD). The power may be transmitted with communications (e.g., bidirectional communications) or without communications.

The power and voltage levels described herein are only examples and other levels may be used. For example, FMP may comprise conventional PoE, higher power PoE, or ESP transmitted over one or more pairs of wires.

The embodiments described herein may be implemented in a single pair (power over Single Pair Ethernet (SPE), single wire pair) multi-drop architecture. It is to be understood that the term "wire pair" or "single pair" as used herein may refer to a single wire pair (single twisted pair, single balanced copper wire pair, single wire pair Ethernet, non-twisted pair) located in a single pair cable (e.g., SPE, Base-T1 Ethernet) or a wire pair located in a multi-pair cable (e.g., two-pair cable, four-pair cable, Base-T Ethernet). The other wire pairs in a multi-pair cable may deliver data, power, or data and power (SPE, PoE, PoDL). The multi-pair cable may comprise multiple instances of single wire pairs (e.g., SPE, PoDL) in parallel or multiple wire pairs connected between a pair center tap (e.g., PoE). As described below, both power and data are transmitted over the wire pair.

Referring now to the drawings, and first to FIG. 1, a simplified example of a single pair multi-drop (SPMD) architecture is shown, in accordance with one embodiment. In this example, a Power Sourcing Equipment (PSE) node 10 provides power and data communications to a plurality of Powered Device (PD) nodes 12a, 12b, 12c, 12d, 12e, 12f, 12g. In one or more embodiments, power may be off prior to the first PD (12a, 12b, 12c, 12d, 12e, 12f, or 12g) connecting to the system, but once the first PD is connected, every subsequent PD will be live inserted (i.e., power already present).

Figure 2A:
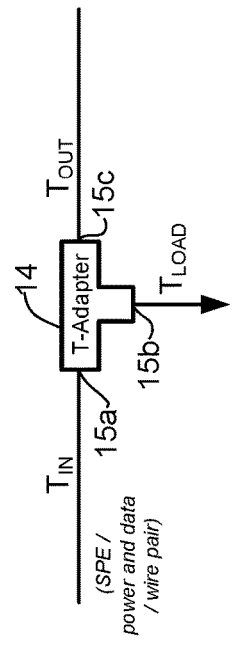
FIG. 2A is a schematic of a T-adapter for use in the system shown in FIG. 1.
Figure 2B:
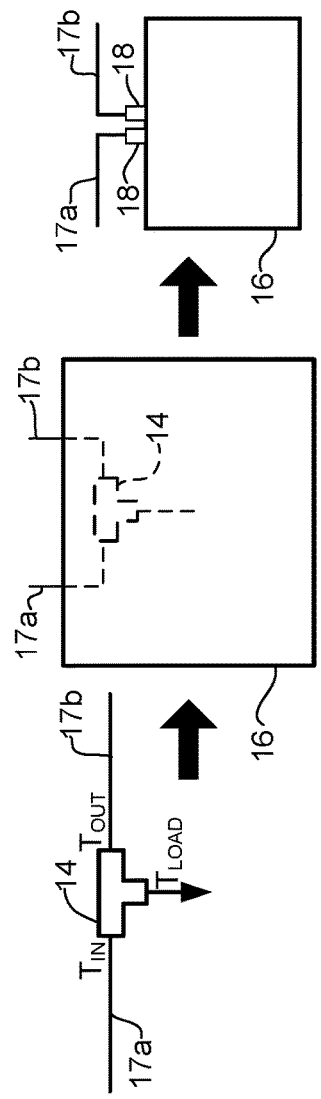
FIG. 2B is a schematic illustrating the T-adapter of FIG. 2A integrated into a pass-through configuration in a network device.

In one or more embodiments, a "T" adapter 14 (referred to herein as a T-adapter) may be used to connect the PDs to the PSE 10 in a multi-drop arrangement as shown in FIG. 1. FIG. 2A illustrates an example of a T-adapter approach that may be used at the PDs. The T-adapter 14 includes a $T_{in}$ port (power in port, input) 15a for receiving power and bi-directional communications from the PSE 10, $T_{LOAD}$ port (first output, power out port, output port) 15b for transmitting power and bi-directional communications to a connected PD, and $T_{OUT}$ port (second output, power out port, output port, throughput port) 15c for transmitting power and bi-directional communications to a downstream PD through another T-adapter. PDs 12a and 12g may have the $T_{OUT}$ port 15C capped off or coupled to an endpoint device (e.g., another PD). FIG. 2B illustrates integration of the T-adapter 14 into a PD node (network device, passthrough device) 16. In this example, the ports 15a, 15b, 15c of FIG. 2A are integrated into the PD 16, with the $T_{IN}$ port and $T_{OUT}$ port coupled to cables 17a and 17b (wire pair, SPE) through connectors 18. Thus, it is to be understood that the term "T-adapter" as used herein may refer to a device external to the PD or integrated within the PD. Structurally, the PSE/PD architecture may appear as a daisy chain (FIG. 2B) but offers minimal loss of power and does not require voltage regeneration. As described below, minimal circuitry is added to the T-adapter to offer a high impedance probe voltage that looks for a signature (authentication) before applying power.

In one or more embodiments, the T-adapter 14 comprises an input 15a for receiving power and data on a wire pair 17a, a first output 15b for transmitting the power and data to a first load (e.g., PD 12d), a second output 15c for transmitting the power and data to a second load (e.g., PD 12e), and a controller (e.g., PMI described below) operable to detect and authenticate the first load at the first output or the second load at the second output and enable power at the first output or the second output in response to load detection and authentication (FIGS. 1, 2A, and 2B). As previously described, the T-adapter may comprise an integrated T-adapter as shown in FIG. 2B.

Figure 3:
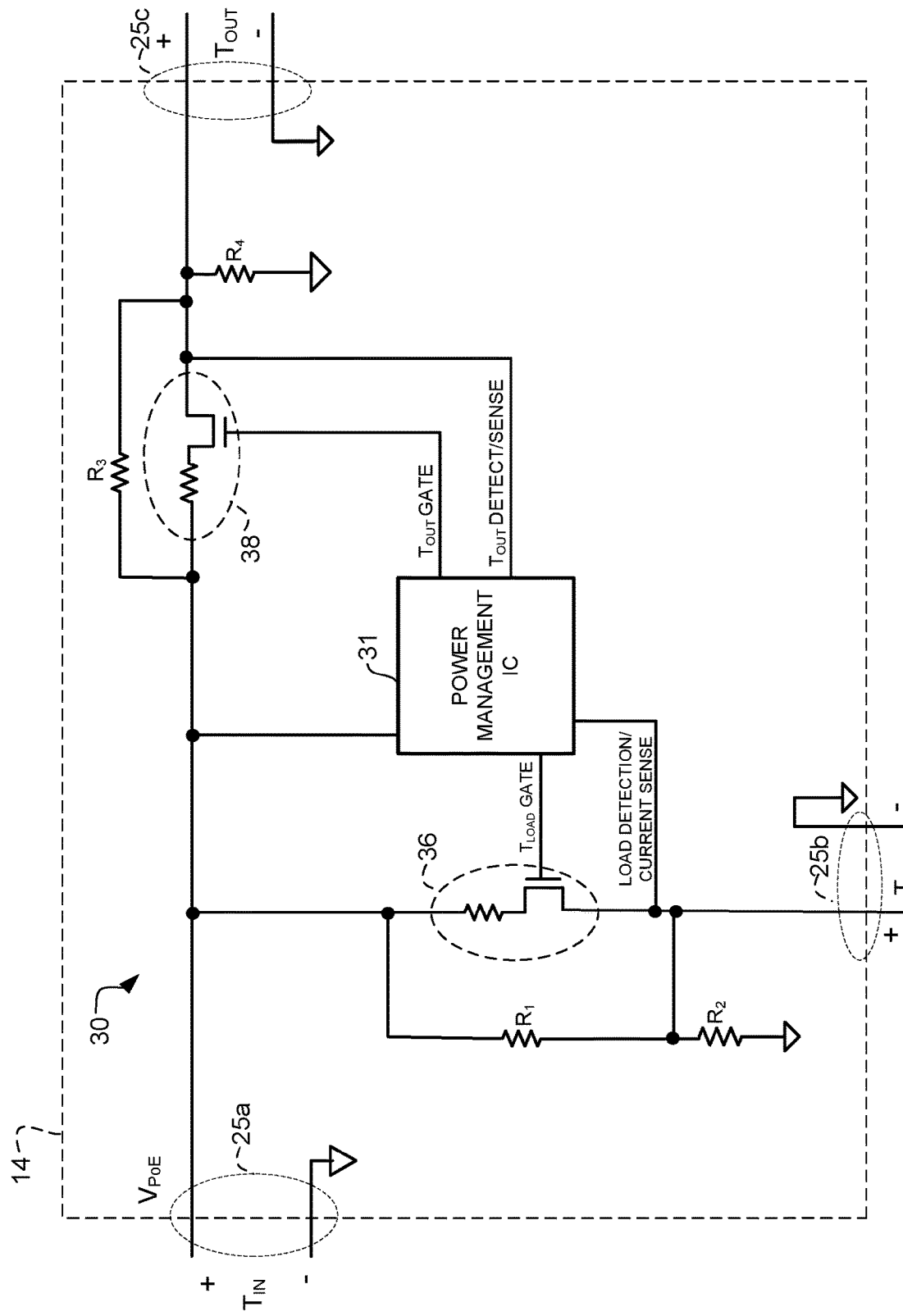
FIG. 3 is an electrical schematic of the T-adapter, in accordance with one embodiment.

FIG. 3 is an electrical schematic of the T-adapter 14 operable for active load verification, in accordance with one embodiment. In the example shown in FIG. 3, a circuit, generally indicated at 30, includes a controller (Power Management Integrated Circuit (PMI)) 31 and two switches 36, 38 for transmitting power and data (received at $T_{IN}$ (VPoE+/−) (input 25a) to a PD device at $T_{LOAD}$ (first output 25b) or one or more downstream devices at $T_{OUT}$ (second output 25c), which is coupled to another T-adapter. As described below, the PMI 31 may be used to perform one or more processes for implementation of the single pair multi-drop system, including, for example, power detection, load authentication, and fault detection (through current sensing).

The switches 36, 38 may comprise one or more transistors (e.g., FETs (Field Effect Transistors)). For example, the T-adapter 14 may comprise at least two FETs for independently enabling the power at each of the outputs 25b, 25c. The switch 36, 38 may comprise any suitable actively controlled switching device, such as a Metal Oxide Semiconductor Field Effect Transistor (MOSFET), Bipolar Junction Transistor (BJT), Gallium Nitride Field Effect Transistor (GaNFET), or solid state relay (SSR). Closing and opening of the switch may be managed by control logic coupled to the switch, which may be part of a processor, controller, or a separate integrated circuit (e.g., power management IC 31). The term "controller" as used herein may refer to the PMI 31 shown in FIG. 3 or one or more individual control devices (FIG. 4) operable to close or open the switch 36, 38 (energize or deenergize the FET) to enable or disable power at $T_{LOAD}$ or $T_{OUT}$. Each output ($T_{LOAD}$, $T_{OUT}$) is coupled to the power input through the FET 36, 38 controlled by the PMI 31 to enable power output (transmittal of power, power and data, SPE). The PMI 31 controls power output at the FETs 36, 38 through $T_{LOAD}$ gate and $T_{OUT}$ gate, respectively. As described below, when the FET 36, 38 is turned off, limited power (high impedance voltage, low current) is provided for use in a discovery phase. Thus, it is to be understood that enabling power as described herein refers to turning on the FET and transmitting the data and power ($V_{PoE}$, SPE) at the respective $T_{LOAD}$ or $T_{OUT}$ port. When the FET is turned off, power is disabled at the respective $T_{LOAD}$ or $T_{OUT}$ port, however, limited power (high impedance voltage) is provided through one or more resistors for use in the discovery phase.

In the example shown in FIG. 3, a divider (e.g., $R_1$ and $R_2$ or $R_3$ and $R_4$) provide the high impedance voltage that the next PD uses for limited power during the discovery phase. In one or more embodiments, the controller (PMI) 31 indicates that it wants power by pulling down the line (e.g., with pull down resistor pulling a wire to a low voltage level) in a deterministic manner or pattern (referred to herein as authentication). This pattern may also be used for an initial classification of the PD. The pattern allows the PD to be distinguished from a fault (e.g., person touching line) and is preferably chosen to limit false positives. After the PMI 31 has completed detection at $T_{LOAD}$ or $T_{OUT}$, it turns on the FET 36 or 38, respectively, thereby providing power to the PD at $T_{LOAD}$ or to a PD coupled to a downstream T-adapter using $T_{OUT}$.

A load detection circuit is operable to provide load detection when the FET 36, 38 is turned off. Once the PMI 31 has completed detection at $T_{LOAD}$ and the load is authenticated (verified), it turns on the FET 36 to power the PD at $T_{LOAD}$. After the PMI 31 has completed detection and authentication of the load at $T_{OUT}$, it turns on FET 38 to transmit power to a downstream PD through a downstream T-adapter connected at $T_{OUT}$ or directly to a PD if the T-adapter 14 is the last T-adapter in a chain. A current sense circuit provides current sensing after power is enabled (FET turned on) at the PMI 31. Resistance is provided between $V_{PoE}$ and a current sense pin for current sensing. A sense pin that was used for load detection may also be used as the current sense pin after power is enabled. The resistance may be provided as a separate resistor (as shown at 36 and 38 in FIG. 3), embedded in a package with the FET, or an $R_{DS(ON)}$ (drain-source on resistance) of the FET. Current sense may be used to disconnect over current events and to remove power upon PD disconnect.

Figure 4:
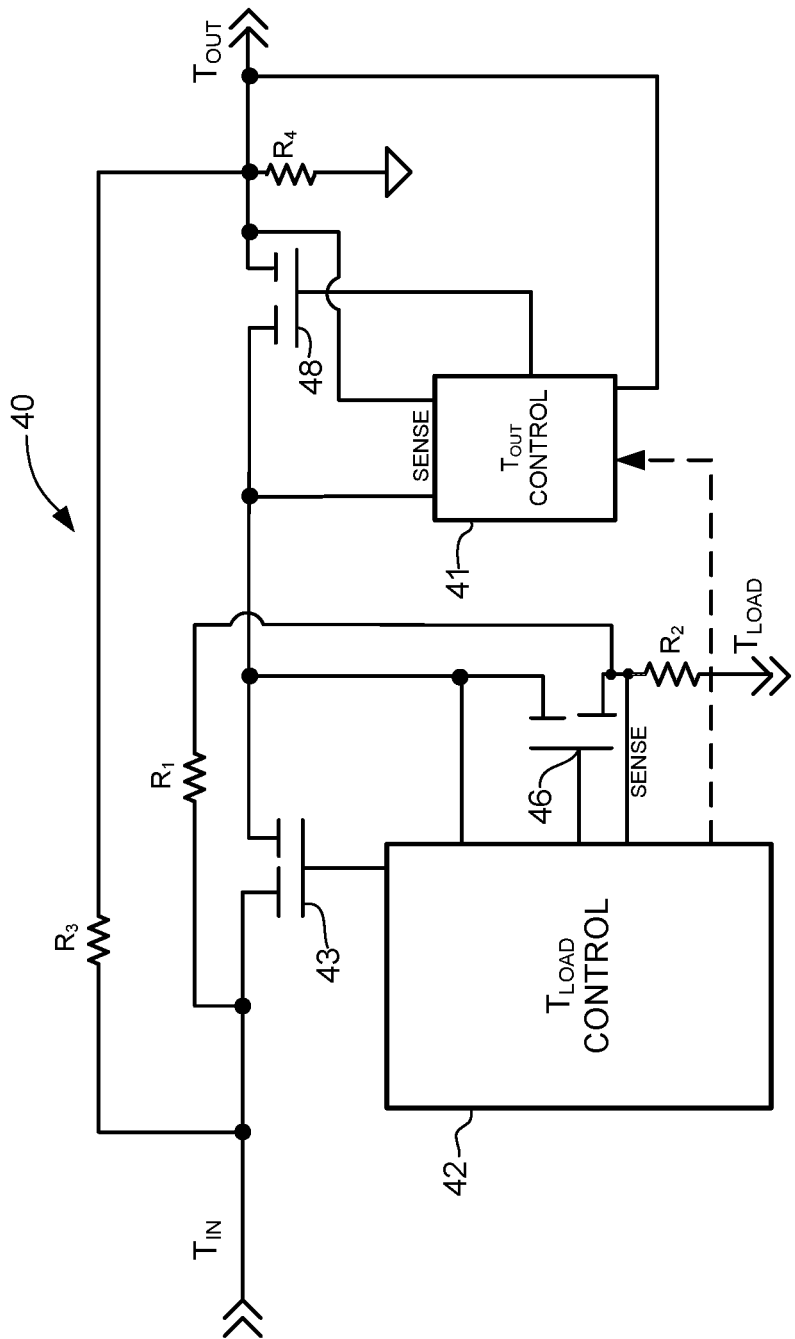
FIG. 4 is an electrical schematic of the T-adapter with an additional switch to turn off power at both output ports, in accordance with one embodiment.

FIG. 4 is an electrical schematic of a T-adapter circuit, generally indicated at 40, which includes an additional switch (FET) 43, which may be used to turn off all power downstream (at both $T_{LOAD}$ and $T_{OUT}$). In this example, the circuit 40 comprises a $T_{LOAD}$ controller 42 and a $T_{OUT}$ controller 41, coupled to FETs 46, 48 for controlling power delivery at $T_{LOAD}$ and $T_{OUT}$, respectively. A current divider (e.g., $R_1$ and $R_2$ or $R_3$ and $R_4$) provide the high impedance voltage that the next PD uses for limited power during the discovery phase, as previously described. In this example, current sense is performed by measuring a drop across FETs 46, 48. The load at $T_{LOAD}$ is authenticated as well as the pass through load at $T_{OUT}$ in the active T design and $T_{LOAD}$ or $T_{OUT}$ power is enabled after a valid load device is detected, as previously described. The circuit 40 powers down if all output current is zero (e.g., $i_c$=0 amps or $i_c$<min load). The pass through authentication is used to maintain sufficient current such that a load (powered device or another T-adapter at $T_{OUT}$) has sufficient power to signal authentication and fully power up all FETs in a chain of T-adapters (FIG. 5).

Figure 5:
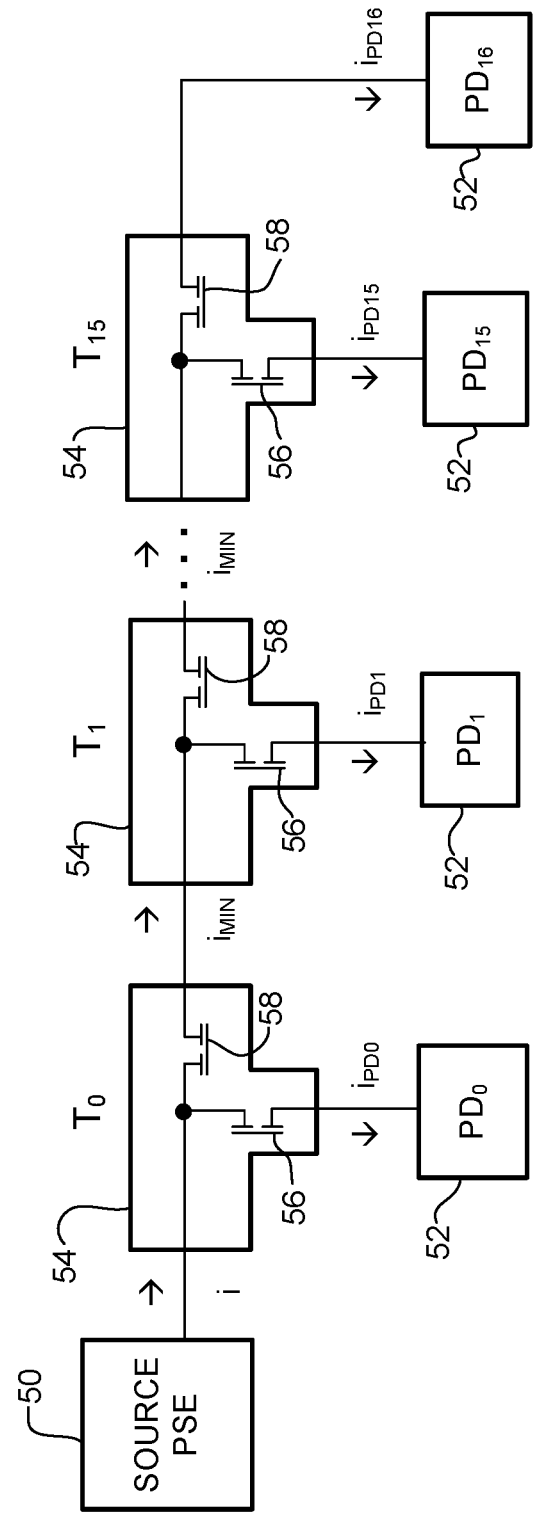
FIG. 5 illustrates a plurality of T-adapters in a multi-drop arrangement for powering a plurality of powered devices from power sourcing equipment, in accordance with one embodiment.

In one or more embodiments, a system comprises a plurality of powered devices 52 and a plurality of T-adapters 54 each comprising an input (25a in FIG. 3) for receiving power and data, a first output (25b in FIG. 3) for transmitting the power and data to one of the powered devices, and a second output (25c in FIG. 3) for transmitting the power and data to the input of a downstream T-adapter (e.g., $T_{15}$) or another one of the powered devices ($PD_{16}$) (FIGS. 3 and 5). Each of the T-adapters 54 comprises a controller (e.g., PMI 31 in FIG. 3) for detecting the powered device ($PD_0$-$PD_{15}$) at the first output and transmitting the power and data to the powered device (e.g., turning FET 56 ON), and detecting the downstream T-adapter 54 or the powered device ($PD_{16}$) at the second output and transmitting the power and data to the downstream T-adapter or the powered device (e.g., turning FET 58 ON). As previously described, the controller may detect a load and transmit power and data at the first output, second output, or both first and second outputs. If the load is removed at one of the outputs, the T-adapter continues to transmit power and data to the remaining load.

FIG. 5 illustrates a source PSE 50 that may provide power (power and data) to a plurality of PDs 52 ($PD_0$, $PD_1$, . . . $PD_{15}$, $PD_{16}$) coupled through the T-adapters 54, each comprising a $T_{LOAD}$ FET 56 and $T_{OUT}$ FET 58 for enabling power. The last T-adapter ($T_{15}$) has a PD ($PD_{16}$) coupled directly to its output. The active T-adapter design allows PD loads to be removed without interfering with other PD loads in the multi-drop chain. As previously described, the T-adapters 54 provide the ability to shed load power in a multi-drop environment. As shown in FIG. 5, a minimum current (high impedance voltage) is provided during a discovery phase and for use in powering up all FETs in the chain. In the example shown in FIG. 5, T-adapter $T_1$ is downstream of T-adapter $T_0$. T-adapter $T_0$ may transmit power and data received from the PSE 50 to any number of PDs (e.g., $PD_0$ connected to T-adapter $T_0$, $PD_1$ connected to downstream T-adapter $T_1$, $PD_{15}$ and $PD_{16}$ connected to downstream T-adapter $T_{15}$). If $PD_1$ is removed from T-adapter $T_1$, T-adapter $T_1$ may still transmit power to one or more downstream T-adapters with connected loads (e.g., $PD_{15}$ at T-adapter $T_{15}$) or a T-adapter interposed between $T_1$ and $T_{15}$. Thus, removal of a PD will not interfere with power transmittal to other PDs in the multi-drop chain.

Figure 6:
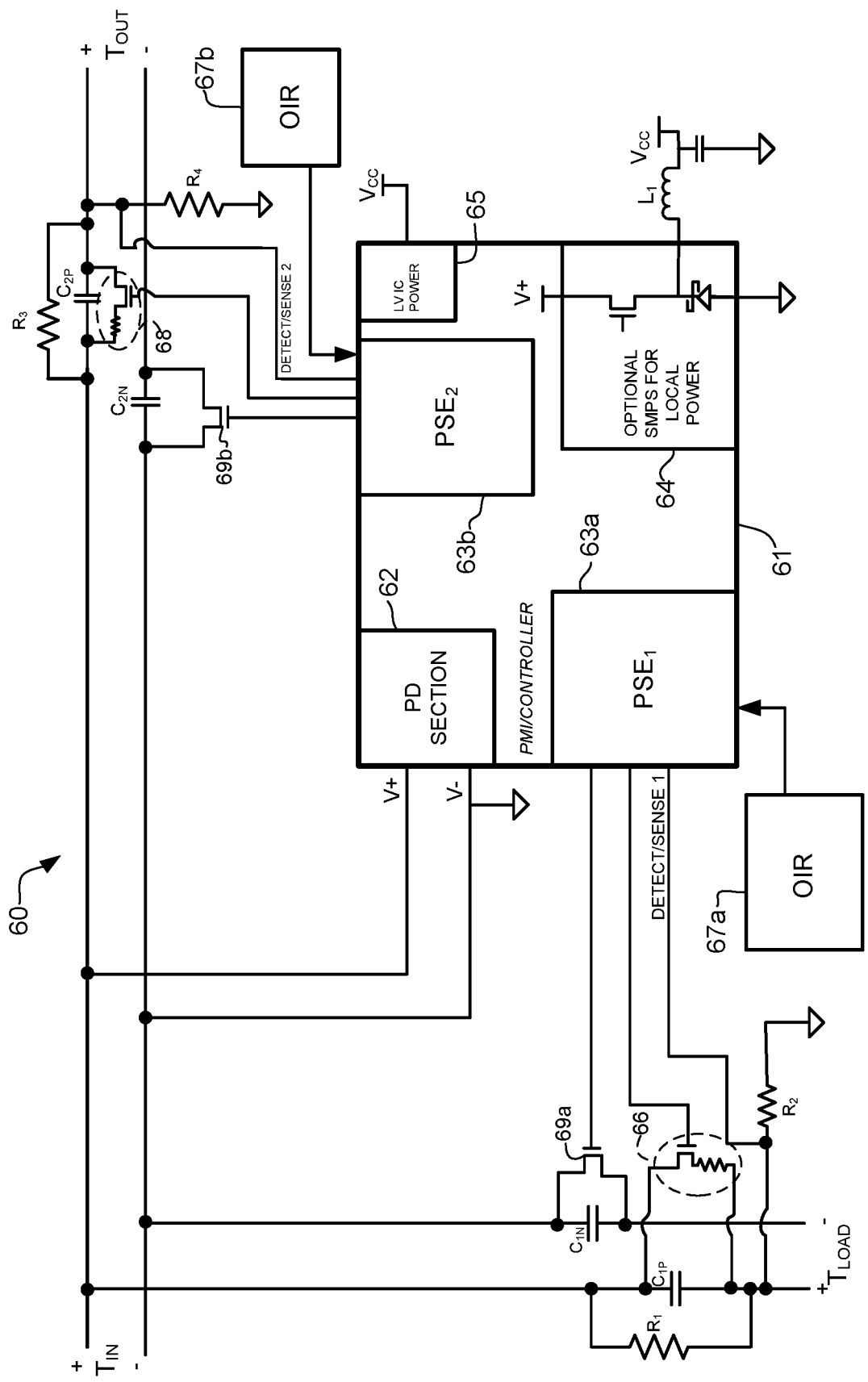
FIG. 6 is an electrical schematic of the T-adapter configured for communications bypass with power turned off at one or both output ports.

FIG. 6 is an electrical schematic of a T-adapter circuit, generally indicated at 60, in accordance with one embodiment. In this example, capacitors ($C_{1P}$, $C_{1N}$, $C_{2P}$, $C_{2N}$) are included in the circuit 60 to provide communications bypass in the event a FET 66, 68 is in an OFF state (power disabled). FETs 69a, 69b are provided to short out capacitors when power is enabled. The bypass circuit provides communications without enabling the power. Power is passed through to a load at $T_{LOAD}$ or the next (downstream) T-adapter at $T_{OUT}$ when an authenticated load or T-adapter is presented, otherwise the active T-adapter output just passes communications without enabling power transmission (FETs 66, 68 in OFF state). SPE (e.g., at 10 Mbps) has a low enough frequency and high enough amplitude to sufficiently cross all T-adapters with minimum loss. Higher speeds may need to energize the FET on authentication/detection in order to pass high speed communications. In one or more embodiments, the T-adapter may authenticate a downstream T-adapter without actually sending an Ethernet based signal.

The example shown in FIG. 6 illustrates additional details of a PMI 61, in accordance with one embodiment. A PD section 62 is shown receiving the power and data ($V_{PoE}$) at $T_{IN}$. The PMI 61 further includes two PSE sections ($PSE_1$ 63a, $PSE_2$ 63b) operable to transmit power to a PD at $T_{LOAD}$ or a PD (T adapter with PD) at $T_{OUT}$, respectively. The PD section 62 at the T-adapter presents the proper load and gets power turned on to the T-adapter. The power is delivered when an authenticated PD is connected to the load point and resistors at 66, 68 are used for current sense. Low voltage (LV) IC power 65 is also shown at the PMI 61 coupled to Vcc. An optional switched mode power supply (SMPS) 64 for local power is coupled to Vcc with inductor $L_1$.

In one or more embodiments, an optional OIR (online installation and removal) device (e.g., button, switch) may be included, as shown in FIG. 6. The OIR buttons 67a, 67b are coupled to the control logic ($PSE_1$, $PSE_2$) that allows graceful removal of i_$T_{LOAD}$ or i_$T_{OUT}$ to prevent communications or power interruptions. In one example, the OIR button 67a, 67b is pressed and the cable is removed within a specified time period (e.g., x seconds). In another example, both OIR buttons 67a, and 67b may be pressed and held to disable all current. In one or more embodiments, LED (Light Emitting Diode) indicators (not shown) that flash and then hold steady (or another signal) may be provided to indicate when it is safe to remove a component. It is to be understood that this is only an only example and other indicators may be used.

One or more embodiments may include redundancy for emergency applications. For example, some applications may need a PD to remain always powered on, even if the PSE stops providing power or the cable is unplugged or not working properly for any reason. Emergency applications may include, for example, fire alarms, emergency lighting, or other applications. X-level redundancy may be implemented in order to provide constant power ON of a PD in emergency situations (e.g., X different PSEs or a PSE and one or more power sources power ON a PD).

Figure 7:
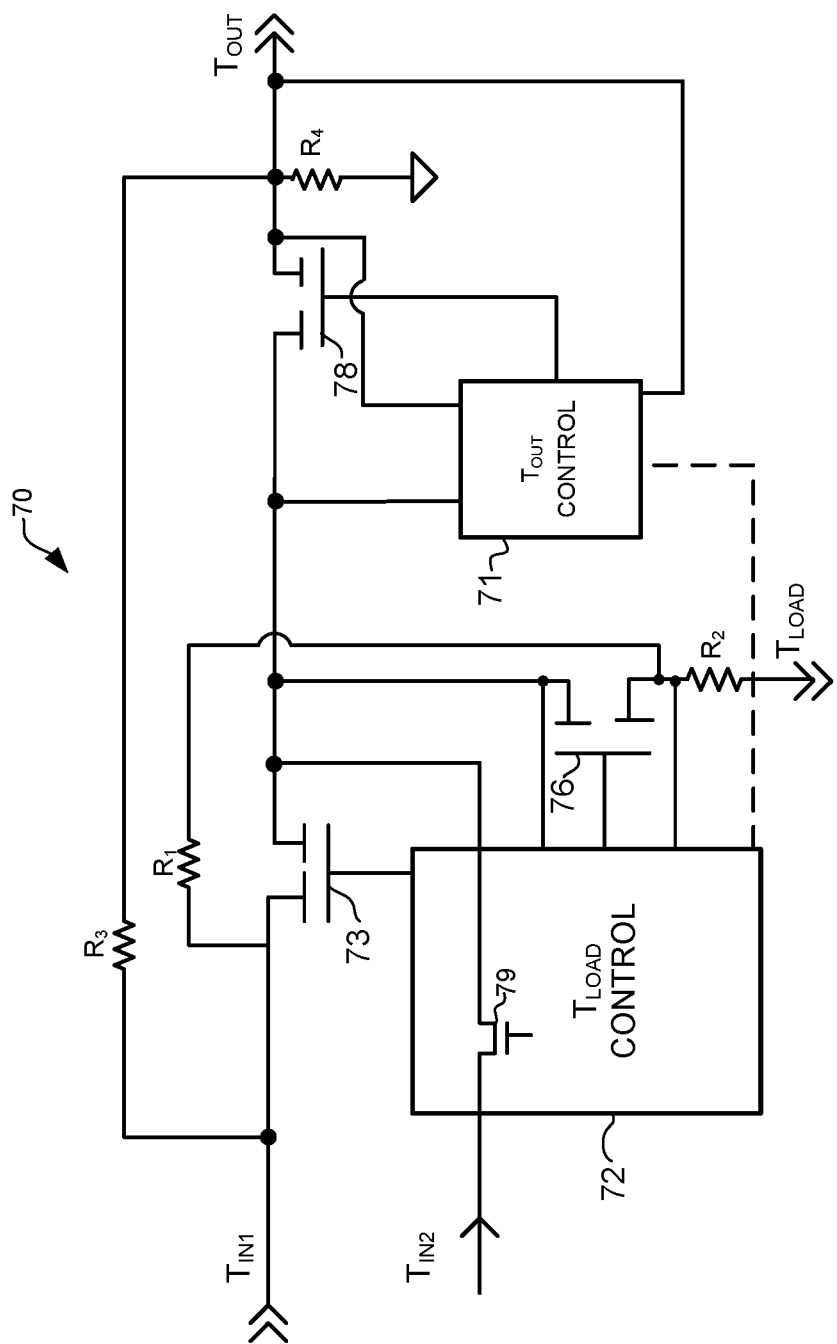
FIG. 7 is an electrical schematic of the T-adapter shown in FIG. 4 with redundant power input, in accordance with one embodiment.

FIG. 7 is an electrical schematic of a circuit, generally indicated at 70, of a T-adapter with a redundant power input at $T_{LOAD}$ control 72. The $T_{LOAD}$ control block 72 controls FET 76 for power delivery at $T_{LOAD}$, and $T_{OUT}$ control block 71 controls FET 78 for power delivery at $T_{OUT}$. A FET 73 is used to turn power off at both outputs, as described above with respect to FIG. 4. In this example, the T-adapter is configured to receive power at $T_{IN1}$ and a redundant power input at $T_{IN2}$ for applications such as emergency lighting that need at least one secondary source of power. FET 79 controls redundant power input $T_{IN2}$. As described below with respect to FIG. 9, the redundant power source does not need to carry data along with the power.

Figure 8:
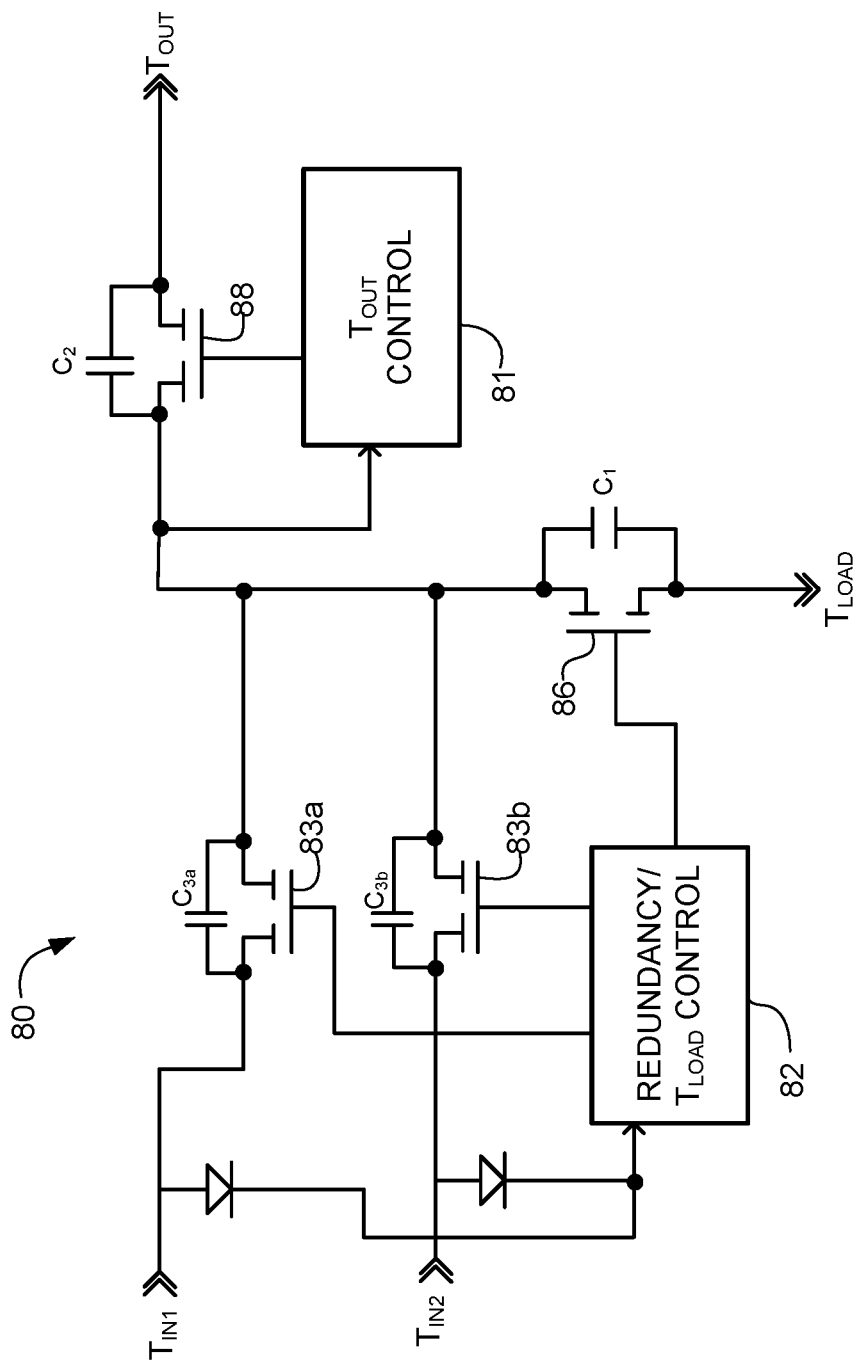
FIG. 8 is an electrical schematic of the T-adapter with communications bypass and redundant power input, in accordance with one embodiment.

FIG. 8 is an electrical schematic of a circuit, generally indicated at 80, configured with a redundant power source $T_{IN2}$, capacitors $C_1$, $C_2$, $C_{3a}$, and $C_{3b}$ and FETs 83a, 83b for providing data communications when power is turned off at FET 86, 88. Redundancy control and power output for $T_{LOAD}$ is provided at redundancy control block 82, and power output at $T_{OUT}$ is controlled at $T_{OUT}$ control block 81.

It is to be understood that the circuits shown and described herein are only examples and the T-adapter may include any number of electrical components (e.g., switches (FETs), resistors, capacitors, diodes, and the like) in any suitable arrangement, without departing from the scope of the embodiments. In one or more embodiments, the circuits may be configured for use with fault managed power.

Figure 9:
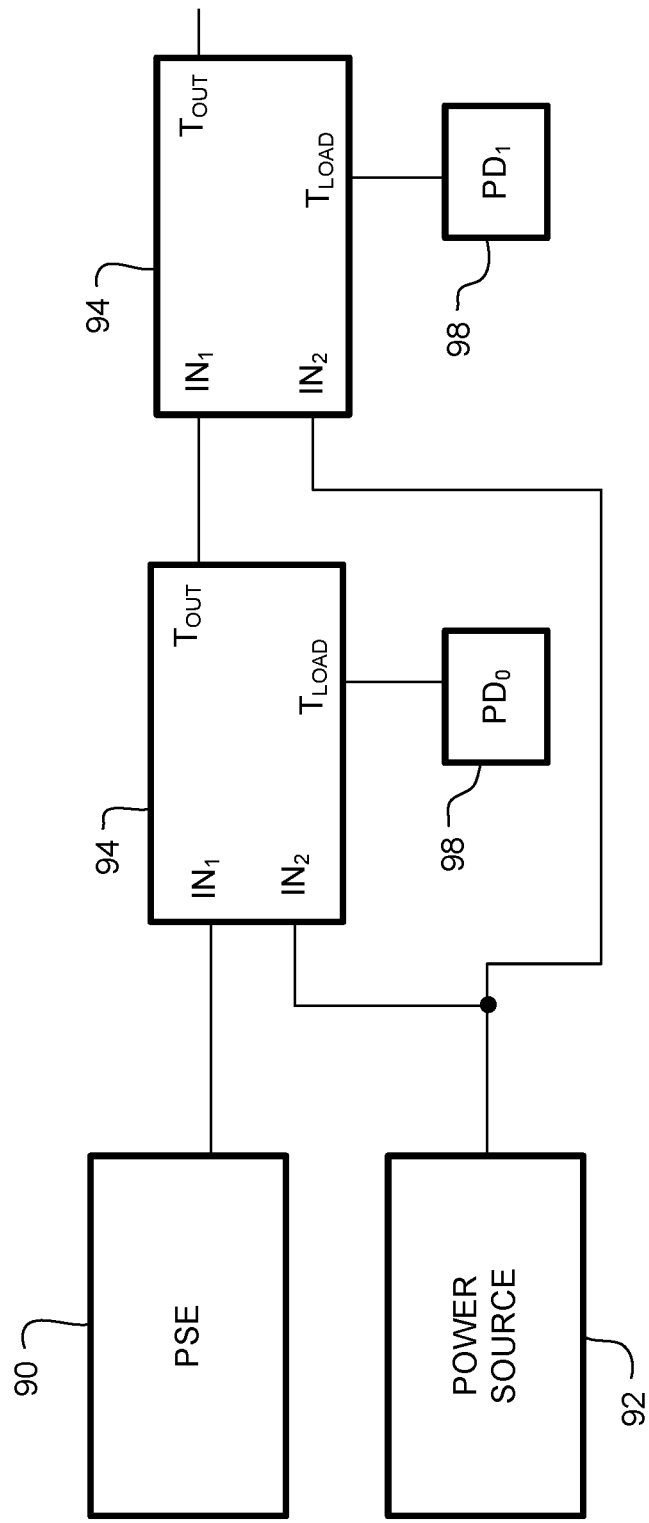
FIG. 9 is a block diagram of a multi-drop system illustrating power redundancy with a backup power source, in accordance with one embodiment.

FIG. 9 is a block diagram illustrating a multi-drop architecture with a PSE 90 providing power and data to two (or more) PDs 98 ($PD_0$, $PD_1$) through T-adapters 94. A power source 92 is provided for backup power to the PDs 98. In this example, only power (no data) is provided at the backup power source 92. Active redundancy may be provided for an application such as emergency lighting where data may not be needed in a fail situation.

Figure 10:
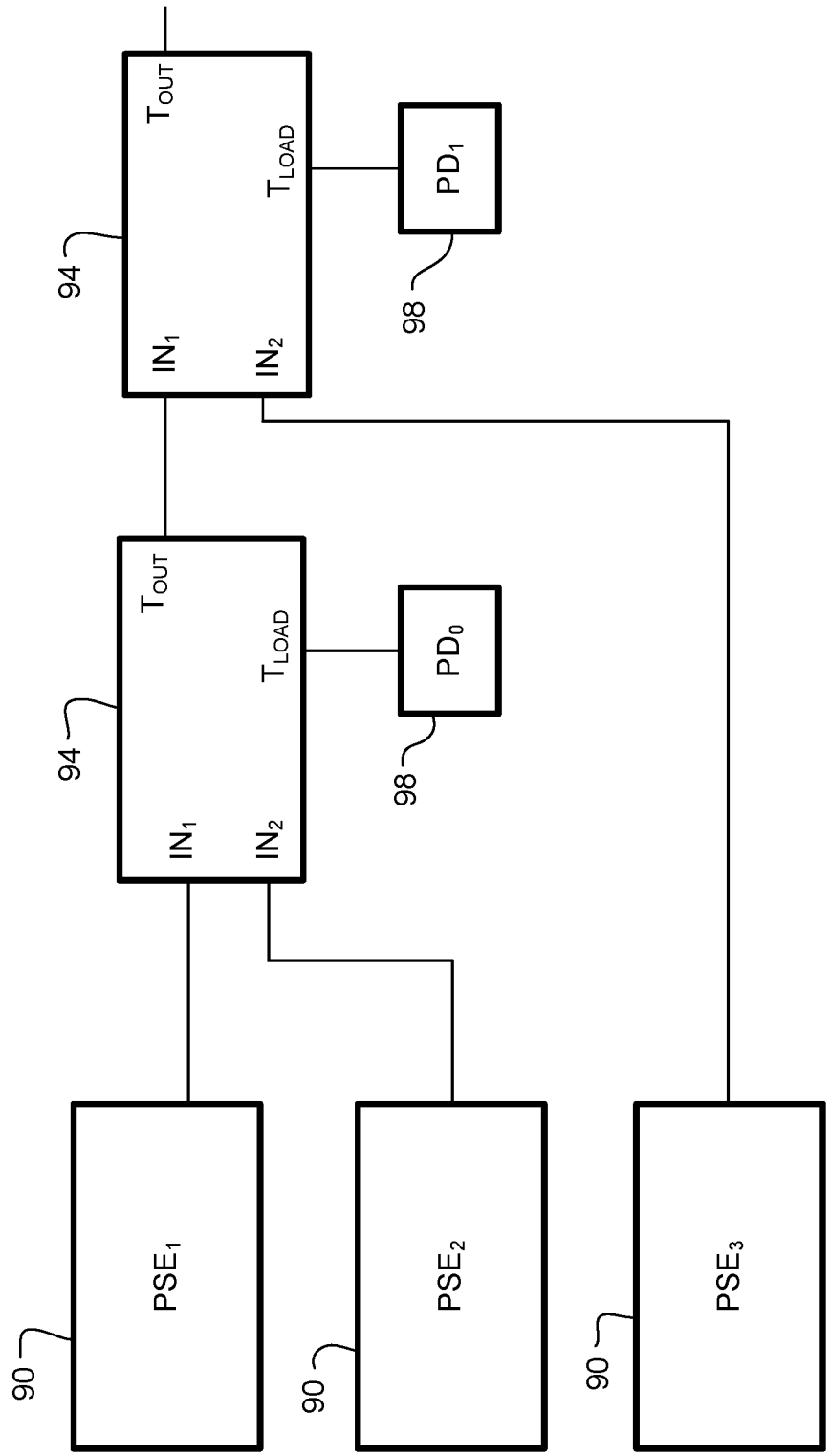
FIG. 10 is a block diagram of a multi-drop system with redundant power sourcing equipment, in accordance with one embodiment.

FIG. 10 is a block diagram illustrating a multi-drop topology with three PSEs 90 ($PSE_1$, $PSE_2$, $PSE_3$) providing power to two (or more) of the PDs 98 ($PD_0$, $PD_1$) through the T-adapters 94. This example provides fully redundant SPE PSE ports.

It is to be understood that the arrangement of T-adapters, PDs, PSEs, and redundant power sources shown and described herein are only examples and that other topologies with a different number or arrangement of T-adapters, PDs, PSEs, or power sources may be used to implement the embodiments described herein, without departing from the scope of the embodiments.

Figure 11:
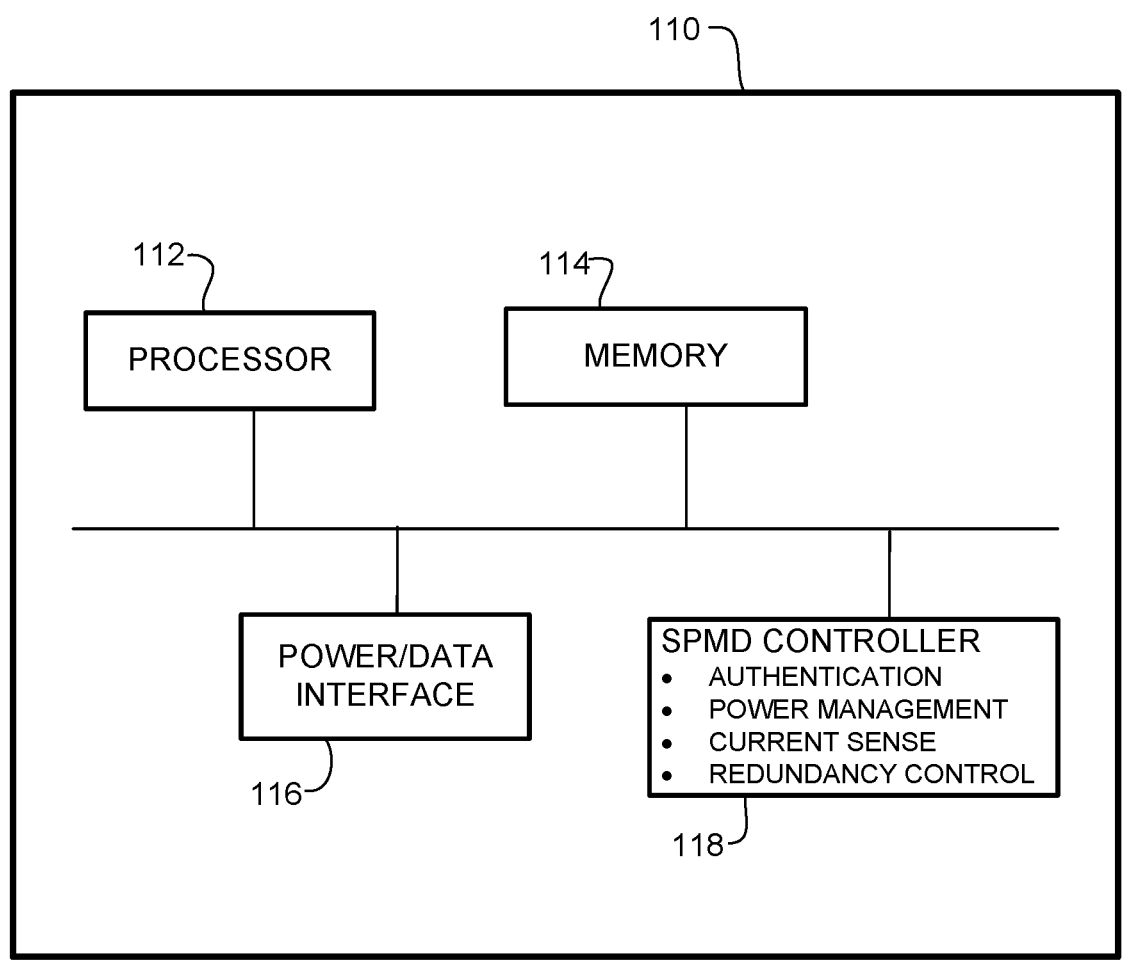
FIG. 11 is a block diagram depicting an example of a device in which the embodiments described herein may be implemented.

FIG. 11 illustrates an example of a device 110 (e.g., T-adapter, PD) that may implement one or more embodiments described herein. In one or more embodiments, the device 110 is a programmable machine that may be implemented in hardware, software, or any combination thereof. The device 110 may include one or more processor 112, memory 114, interface 116, and controller 118 (e.g., PMI, one or more ICs). It is to be understood that all components shown may not be included in a device.

Memory 114 may be a volatile memory or non-volatile storage, which stores various applications, modules, and data for execution and use by the processor. The device (e.g., PD) may include any number of memory components.

Logic may be encoded in one or more tangible media for execution by the processor 112. For example, the processor 112 may execute codes stored in a computer-readable medium such as memory 114. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The device 110 may include any number of processors 112.

The interface 116 may comprise any number of interfaces for transmitting or receiving power, data, or power and data.

It is to be understood that the device 110 shown in FIG. 11 and described above is only an example and that different configurations of devices may be used. For example, the device may further include any suitable combination of hardware, software, algorithms, processors, devices, components, or elements operable to facilitate the capabilities described herein.

Figure 12:
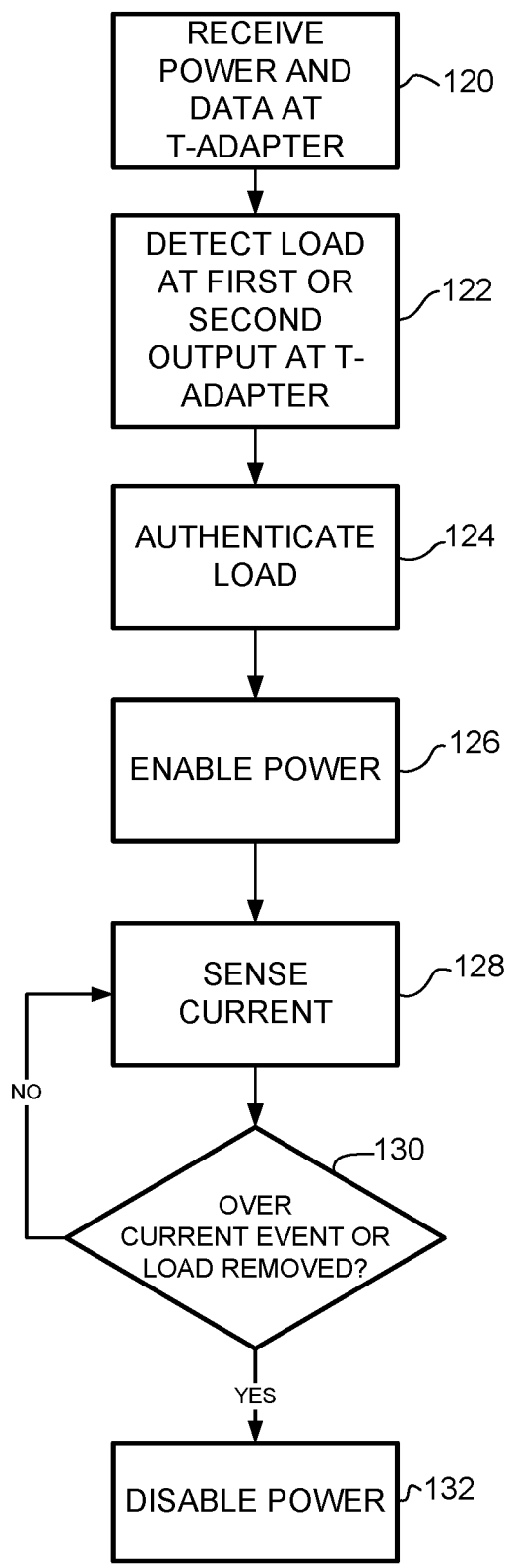
FIG. 12 is a flowchart illustrating an overview of a process for transmitting power and data at a T-adapter in a single pair multi-drop system, in accordance with one embodiment.

FIG. 12 is a flowchart illustrating an overview of a process for implementing the active T-adapter described herein, in accordance with one or more embodiments. Power and data is received at an input of the T-adapter (step 120). The T-adapter detects a load at a first output (e.g., $T_{LOAD}$ output coupled to PD) or second output (e.g., $T_{OUT}$ output coupled to a downstream T-adapter or PD) (step 122). The T-adapter authenticates (verifies) the load (step 124). For example, a PD block of the PMI may pull down voltage on a wire to signal to a PSE that power is desired. The wire may be pulled down in a defined pattern, which may be used to distinguish the PD from a fault and may also be used for initial classification. As previously described, high impedance voltage is used for limited power during the discovery phase while the FETs are closed. Once authenticated, the T-adapter powers the load (e.g., by energizing FET or closing switch to transmit the power and data at the output) (step 126). The T-adapter senses the current to identify an over current event or load disconnect (PD disconnect, load removal) (step 128). If an over current event or load removal (PD disconnect) is identified (step 130), the T-adapter removes power at the corresponding output (e.g., deenergizes FET, opens switch) (step 132). Steps 122 through 132 may be repeated for a load at the other output port. Any of the PD loads may be removed without interfering with other PD loads in the multi-drop chain.

It is to be understood that the process shown in FIG. 12 and described above is only an example and steps may be added, removed, modified, or combined, without departing from the scope of the embodiments. For example, if the power is disabled, data may still be transmitted through use of capacitors, as previously described. Also, a load may be authenticated only at one of the output ports (e.g., pass through port (second output)) in one or more embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A T-adapter comprising:
    an input for receiving power and data on a single wire pair, the single wire pair comprising a positive wire and a negative wire, wherein the single wire pair provides the power through a difference in voltage between the positive wire and the negative wire;
    a first output for transmitting the power and data to a first load over a first wire pair;
    a second output for transmitting the power and data to a second load over a second wire pair; and
    a controller operable to:
        detect said first load across the first wire pair of said first output or said second load across the second wire pair of said second output;
        authenticate said first load at said first output or said second load at said second output by detecting a deterministic pattern at said first output or said second output;
        distinguish between said first load and a first fault across the first wire pair or between said second load and a second fault across the second wire pair based on the deterministic pattern;
        pull down a voltage on the positive wire or the negative wire of the single wire pair in a defined pattern to signal power is desired at the input; and
        enable power over the first wire pair of said first output or over the second wire pair of said second output in response to load detection, load authentication, and load distinguishing at said first output or said second output.

2. The T-adapter of claim 1 further comprising a load detection and current sense circuit operable to sense current after enabling the power.

3. The T-adapter of claim 2 wherein the power is disabled upon sensing an over current event or a load removal.

4. The T-adapter of claim 1 further comprising at least two transistors for independently enabling the power at said first output or said second output.

5. The T-adapter of claim 1 wherein said first load comprises a first powered device connected to said first output and said second load comprises another T-adapter connected to said second output.

6. The T-adapter of claim 1 wherein said first load comprises a first powered device connected to said first output and said second load comprises a second powered device connected to said second output.

7. The T-adapter of claim 1 wherein the T-adapter is integrated into a powered device comprising said first load.

8. The T-adapter of claim 1 wherein high impedance voltage is provided at said first output or said second output for use in load detection prior to enabling the power at said first output or said second output.

9. The T-adapter of claim 1 wherein the controller is configured to receive input from an online installation and removal device and disable current on at least one of said first output and said second output.

10. The T-adapter of claim 1 further comprising a bypass circuit for providing communications without enabling the power.

11. The T-adapter of claim 1 further comprising a second power input for providing a redundant power source.

12. The T-adapter of claim 11 wherein said second power input provides a redundant power and data source.

13. A method comprising:
    receiving power and data over a single wire pair at an input of a T-adapter, the single wire pair comprising a positive wire and a negative wire, wherein the single wire pair provides the power through a difference in voltage between the positive wire and negative wire;
    pulling down a voltage on the positive wire or the negative wire of the single wire pair in a defined pattern to signal power is desired at the input;
    detecting a first load across a first wire pair of a first output at the T-adapter;
    authenticating the first load by detecting a deterministic pattern at the first output;
    distinguishing between the first load and a first fault across the first wire pair based on the deterministic pattern;
    transmitting the power and data over the first wire pair of said first output;
    detecting a second load across a second wire pair of a second output at the T-adapter;
    authenticating the second load by detecting the deterministic pattern at the second output;
    distinguishing between the second load and a second fault across the second wire pair based on the deterministic pattern; and
    transmitting the power and data over the second wire pair of said second output.

14. The method of claim 13 further comprising sensing a current at each of said first output and said second output and removing the power at one of said first output or said second output upon identifying an over current event or a load removal.

15. The method of claim 13 wherein transmitting the power comprises turning on a transistor and further comprising turning off the transistor and continuing to transmit communications.

16. The method of claim 13, further comprising providing a redundant power source at a second power input of the T-adapter.

17. The method of claim 16, further comprising providing a redundant data source at the second power input.

18. A system comprising:
- a plurality of powered devices including a first powered device and a second powered device; and
- a plurality of T-adapters including a first T-adapter, each particular T-adapter comprising a corresponding input for receiving power and data on a single wire pair, a corresponding first output for transmitting the power and data over a first wire pair to one of the plurality of powered devices, and a corresponding second output for transmitting the power and data over a second wire pair to a subsequent input of a subsequent T-adapter downstream of the particular T-adapter or another one of the plurality of powered devices, wherein the single wire pair, the first wire pair, and the second wire pair each provides the power through difference in voltage between a positive wire and a negative wire;
- wherein the first T-adapter comprises a controller for detecting the first powered device at the corresponding first output of the first T-adapter and transmitting the power and data over the first wire pair to the first powered device, for authenticating the first powered device by detecting a deterministic pattern at the corresponding first output, for distinguishing between the first powered device and a first fault across the corresponding first output of the first T-adapter, for pulling down a voltage on the positive wire of the single wire pair in a defined pattern to verify a load to an upstream adapter, and for distinguishing between a second fault across the corresponding second output of the first T-adapter and the subsequent T-adapter downstream of the first T-adapter or the second powered device at the corresponding second output of the first T-adapter and transmitting the power and data over the second wire pair to the subsequent T-adapter downstream of the first T-adapter or the second powered device.

19. The system of claim 18 wherein the controller is operable to monitor a current at each of said first output and said second output upon enabling transmittal of the power and data and disable power upon identifying an over current event or a load removal.

20. The system of claim 18, wherein the first T-adapter further comprises a second power input for providing a redundant power source and a redundant data source.

* * * * *